(12) United States Patent
Eriksson et al.

(10) Patent No.: US 7,578,530 B2
(45) Date of Patent: Aug. 25, 2009

(54) COUPLING DEVICE

(75) Inventors: Cristian Eriksson, Mölndal (SE); Peter Sandlin, Älvängen (SE); Paul Trhulj, Göteborg (SE); Göran Kristiansson, Västra Frölunda (SE)

(73) Assignee: Kest Technology AB, Gothenburg (SE)

( * ) Notice: Subject to any disclaimer, the term of this patent is extended or adjusted under 35 U.S.C. 154(b) by 22 days.

(21) Appl. No.: 11/829,473

(22) Filed: Jul. 27, 2007

(65) Prior Publication Data

US 2008/0252075 A1 Oct. 16, 2008

(30) Foreign Application Priority Data

Apr. 16, 2007 (SE) .................................... 0700942

(51) Int. Cl.
*F16L 23/00* (2006.01)

(52) U.S. Cl. ....................... 285/367; 285/411

(58) Field of Classification Search ................. 285/366, 285/367, 365, 409, 411, 410
See application file for complete search history.

(56) References Cited

U.S. PATENT DOCUMENTS

| | | | |
|---|---|---|---|
| 3,298,698 A * | 1/1967 | Condon | ................ 277/616 |
| 3,680,894 A * | 8/1972 | Young | ................ 285/112 |
| 3,964,774 A * | 6/1976 | Wollin et al. | ................ 285/409 |
| 3,977,705 A * | 8/1976 | Thiessen et al. | ................ 285/112 |
| 4,657,284 A * | 4/1987 | Fiori | ................ 285/39 |
| 4,702,499 A * | 10/1987 | deRaymond et al. | ................ 285/112 |
| 4,822,077 A * | 4/1989 | Hendrickson | ................ 285/12 |
| 6,056,332 A * | 5/2000 | Foster | ................ 285/367 |
| 6,354,636 B2 * | 3/2002 | Matsuzawa et al. | ................ 285/334.5 |
| 6,672,631 B1 * | 1/2004 | Weinhold | ................ 285/409 |
| 7,290,805 B2 * | 11/2007 | Wu | ................ 285/365 |
| 7,341,287 B2 * | 3/2008 | Gibb et al. | ................ 285/367 |
| 7,401,819 B2 * | 7/2008 | Gibb et al. | ................ 285/373 |
| 2003/0129068 A1 | 7/2003 | Oehman, Jr. | |

* cited by examiner

*Primary Examiner*—David E Bochna
(74) *Attorney, Agent, or Firm*—Barnes & Thornburg LLP (57) ABSTRACT

A coupling device includes a first tension loop connected to a second tension loop. The first and second tension loops are moveable with respect to one another to establish open and closed positions. An interior surface is defined by the first and second tension loops in the closed position. A recess is defined by the interior surface. A first connecting flange clamping edge is defined by the first and second tension loops on a first side of the recess. A second connecting flange clamping edge is defined by the first and second tension loops on a second side of the recess. At a facing end, at least one of the first and second tension loops has an introduction surface abutting the second connection flange clamping edge, the introduction surface being beveled radially inwardly towards a central hole defined by the first and second tension loops.

13 Claims, 8 Drawing Sheets

COUPLING DEVICE

The invention is related to a coupling device according to the preamble of claim 1.

STATE OF THE ART

Today several different types of coupling devices are known on the market intended for coupling of a tube with connecting flange to a connection which can be an inlet or outlet portion on a container or a tank and which also is provided with a connection flange. The tube can also be connectable by means of the coupling to another tube with connection flange. Containers which are used within the process industry must in many cases be aseptic or keep a high degree of purity. At such coupling devises which preferably are used within the biopharma, biotech, pharmaceutical or food industry, the environment is very important and one speaks then about an aseptic or almost aseptic environment. In such an environment very high demands are made on the components which are part of the process industry devises, said components besides being made of specific materials, often of stainless steel, must be very reliable with regard to the risk of leakage. Leakage can imply that the product will be contaminated and in this way unusable.

Very high demands are also made on the washing-up and sterilizing of the equipment. Washing-up and sterilizing often take place where it is mounted without loosening the equipment, so called CIP, Cleaning-In-Place, and SIP, Sterilization-In-Place. Even the coupling devices which keep the components included therein must keep a high quality.

The demands on the coupling devices are also high with respect to the repeatability at montage, i.e., having a validated procedure so that the montage occurs on the same way every time and that one uses the same equipment which one knows is functionally tested.

These couplings are also often used in clean chambers where the operator wear clothing for clean chambers and gloves, which also makes a demand for the user friendliness.

Those demands becomes higher and higher by using consumer goods in those process systems. This with regard to that one between every manufacture takes away the used equipment and put on a new disposable equipment. Examples of such a disposable equipment is for instance sampling systems.

A coupling device for a container of the above mentioned type is disclosed in the American patent application US 2003/0129068 in which a clamp consisting of three tension loops is described. The tension loops are articulately connected to each other and can together enclose a connection which can consist of two against each other abutting connection flanges of two tube ends or the connection flanges of a tube and an opening in a tank.

To connect a tube to an opening of a container by means of the couplings, which are available on the market today, the coupling must be kept on place while holding the tube so that the connecting flange of the tube is abutting the connecting flange of the socket of the opening. However, it is often an opinion that those solutions are complicated and difficult to use due to the fact that sometimes two men are required to hold those parts on place. It is also difficult to achieve a good repeatability when one uses the tank couplings of today.

OBJECT OF THE INVENTION

The object of the invention is to provide an improved coupling device which makes it possible to connect a tube at a socket of an opening on a tank or alike by means of a simple manipulation. The coupling device should further be reliable, cost effective and simple to use so that the above mentioned problems are minimized. A further object with the coupling device according to the invention is that it shall be aseptically designed, i.e., it shall have a very good clean ability with CIP or SIP.

BRIEF DESCRIPTION OF THE INVENTION

The object is achieved by means of a coupling device according to the characterizing portion of claim 1.

The sub-claims defines preferable embodiments of the invention.

Hence, according to the invention the bevelled inner loop surfaces in the coupling are displaced in relation to each other, i.e., the inner, towards the coupling device faced edges of the bevelled, ring formed loop surfaces have different diameters. Thereby, it is possible to provide a coupling device where at sufficient apart disposal of the tension loops it is admitted that for instance the connection flanges of the tube can be brought in between the connection loops. At practical use, first the connection flange of the tank opening has been mounted in the recess of the coupling device where it is prevented from falling out owing to the design of the edge of the loop surfaces of the tension loops which are situated closest to the tank, i.e., these edges are situated closest to the centre line. The coupling is further so arranged in respect of its locking or tension construction (the placing of the edges in the coupling) that it cannot be opened so much that it can fall out of engagement with the connection flanges of the tank opening. These connection flanges have accordingly first been placed in the coupling, whereupon the closing device which for instance can be a nut/screw device or a tension device is positioned in a predetermined open position to make it possible that the connection flanges of the tube can be brought into the coupling from the opposed side of the coupling. Thereby, the coupling of a tube to the tank is easily provided. At a further development of the invention the tension loops are elastically loaded in the direction against the seat of the connection flanges, whereby the connection flanges of the tube can be brought into the coupling and be hold in this position by means of the spring force, where after the closer device is activated to lock the tension loops against each other.

DESCRIPTION OF THE DRAWINGS

The invention is described in further detail below with reference to the accompanying drawings which show preferred embodiments.

DESCRIPTION OF EMBODIMENTS

Figure 1:
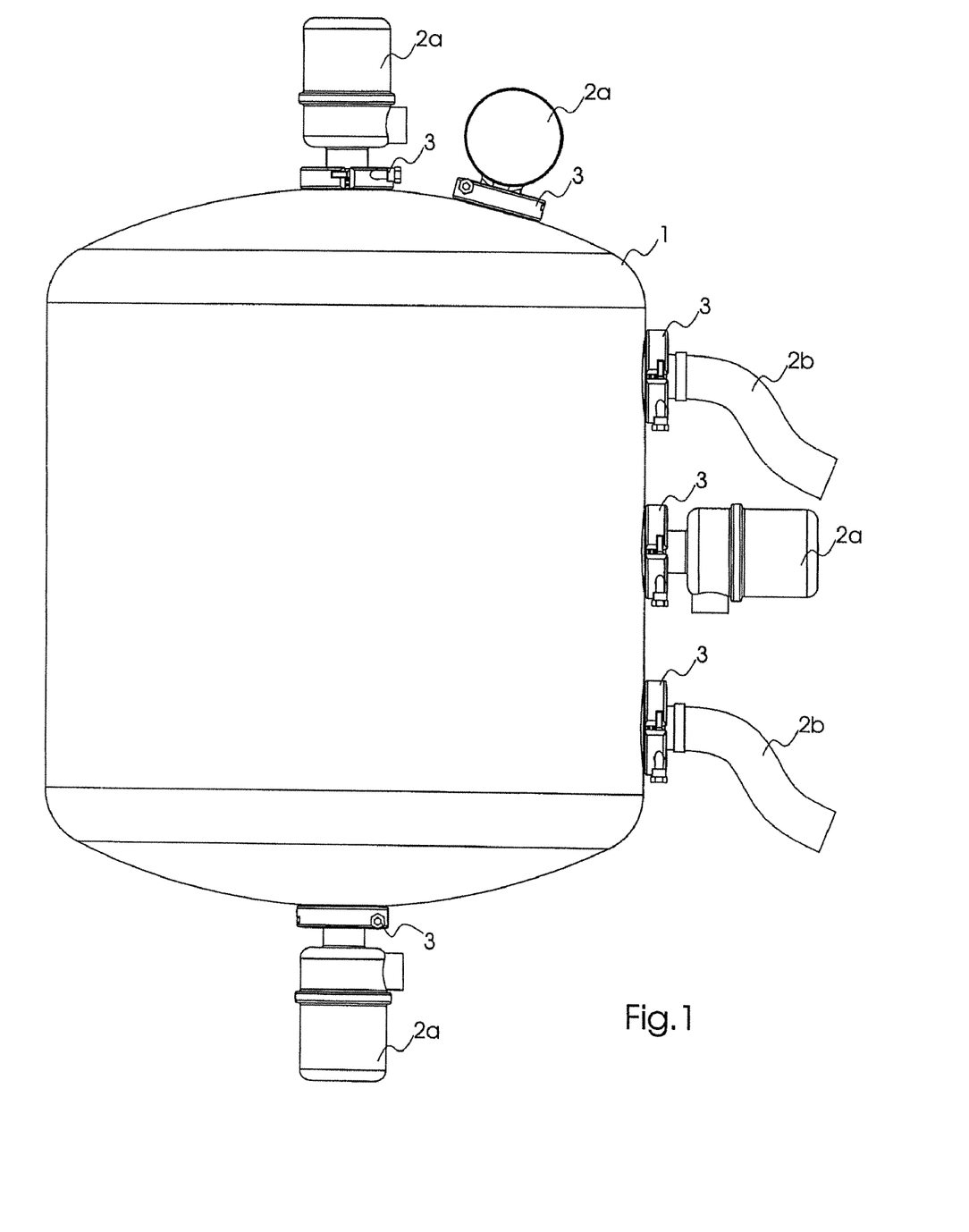
FIG. 1 shows a partial section of a process tank which is provided with coupling devices according to the invention for connection of tubes.
Figure 2:
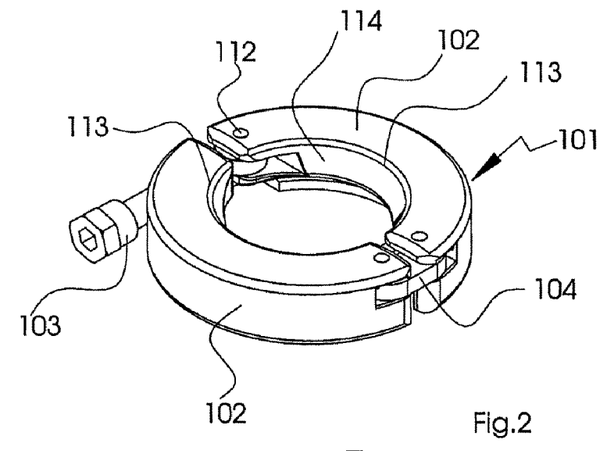
FIG. 2 shows a perspective view from above of a first embodiment of a coupling device according to the invention.
Figure 3:
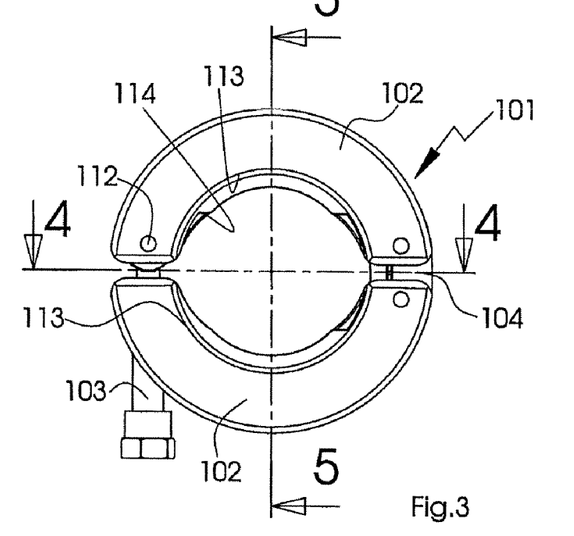
FIG. 3 shows a plan view of the coupling device in FIG. 1.
Figure 4:
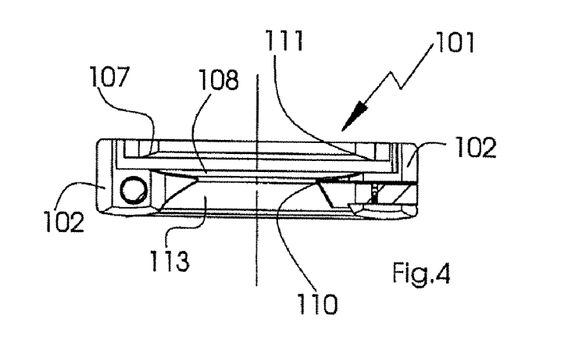
FIG. 4 shows a sectional view after the line 4-4 I FIG. 3.

In FIG. 1 a tank is shown wherein instruments 2a and connection tubes 2b have been connected to the tank at the openings thereof 1 by means of coupling devices 3 according to the invention.

Figure 5:
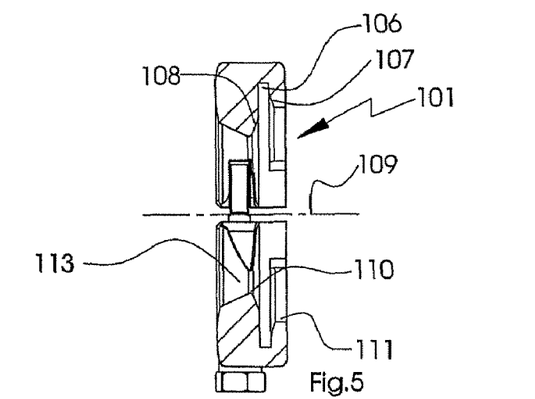
FIG. 5 shows a sectional view after the line 5-5 in FIG. 3.
Figure 6:
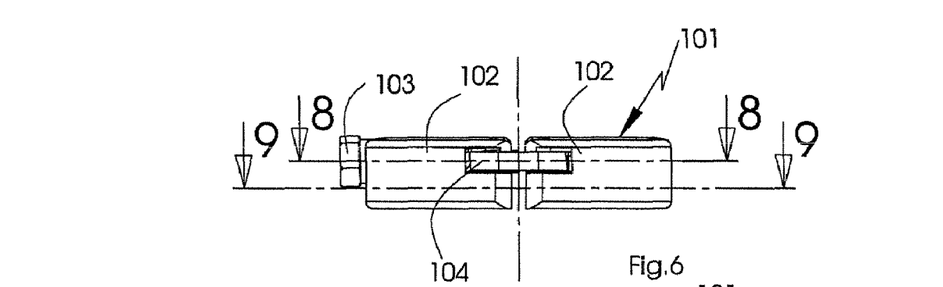
FIG. 6 shows a side view of the coupling device in FIG. 1.
Figure 7:
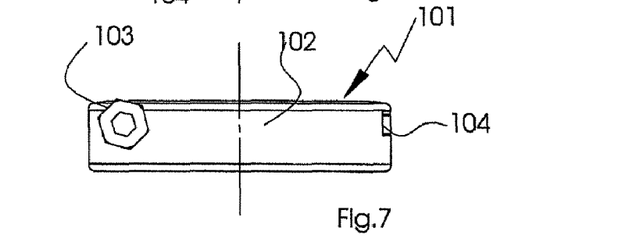
FIG. 7 shows a side view of the coupling device in FIG. 1 turned 90° in relation to FIG. 6.
Figure 8:
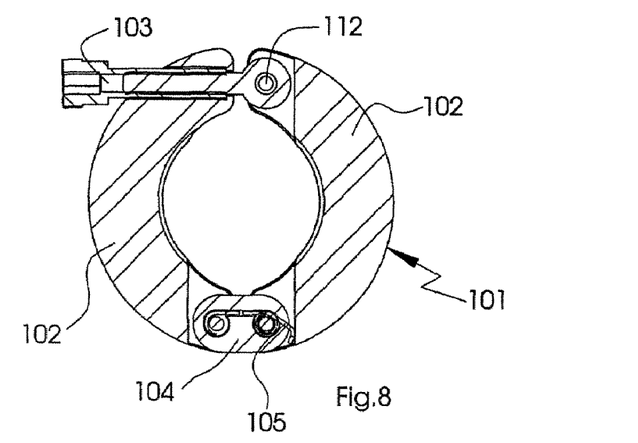
FIG. 8 shows a sectional view after the line 8-8 in FIG. 3.
Figure 9:
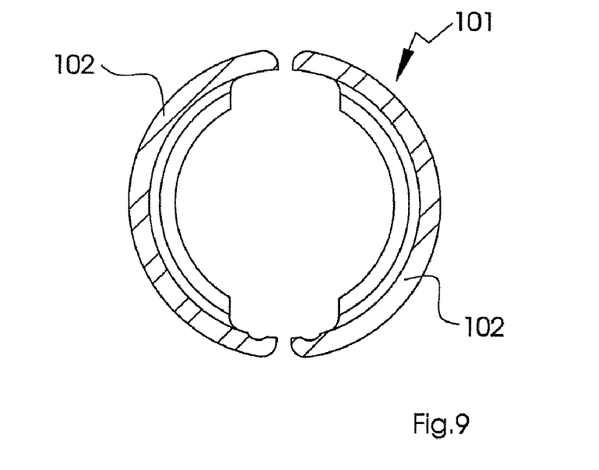
FIG. 9 shows a sectional view after the line 9-9 ion FIG. 3.
Figure 10:
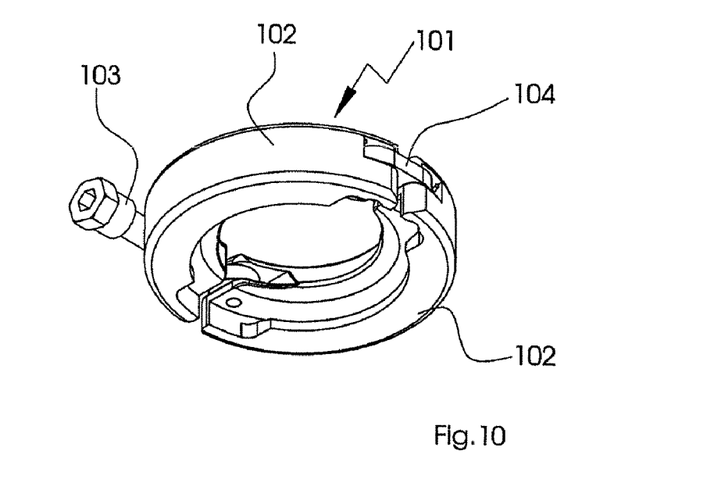
FIG. 10 shows a perspective view from below of the coupling device in FIG. 1.
Figure 11:
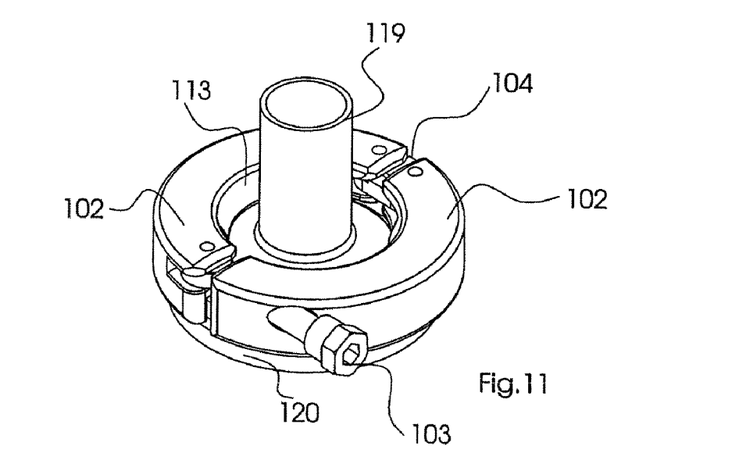
FIG. 11 shows a perspective view from above of the coupling device in FIG. 1 in mounted position.
Figure 12:
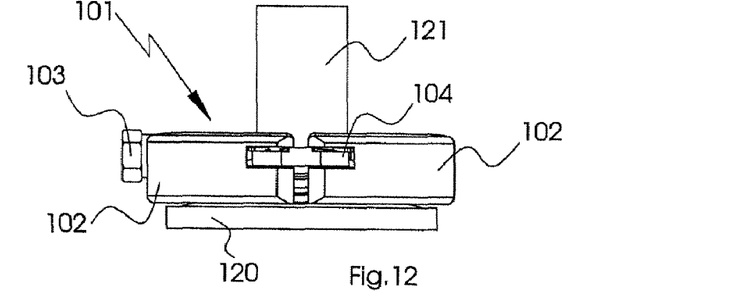
FIG. 12 shows a side view of the coupling device according to FIG. 11.
Figure 13:
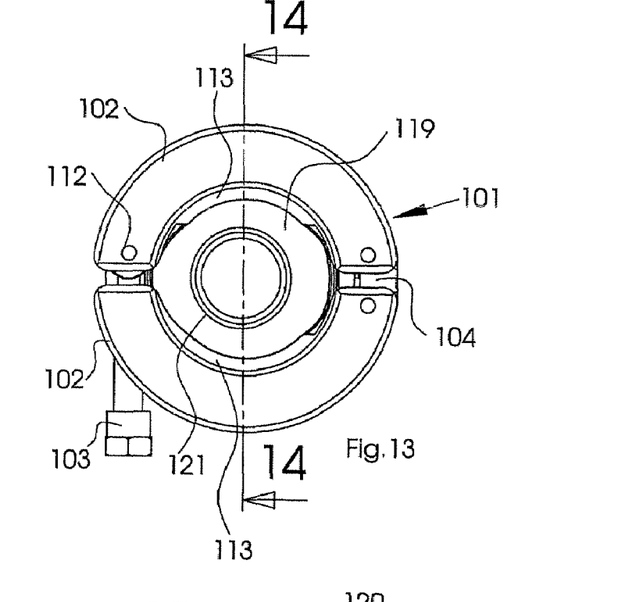
FIG. 13 shows a plan view of the coupling device according to FIG. 11.
Figure 14:
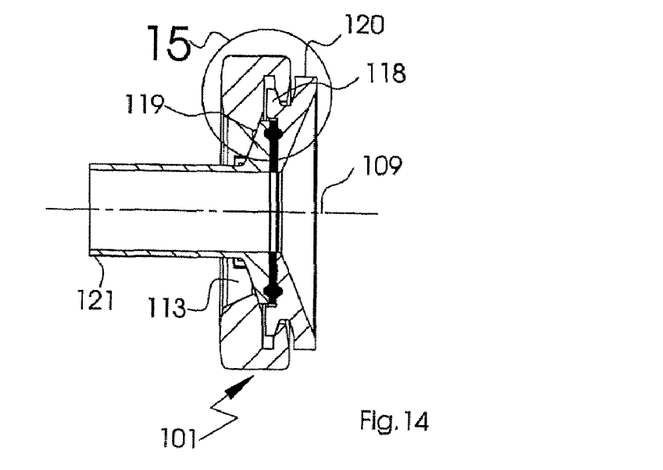
FIG. 14 shows a sectional view after the line 14-14 in FIG. 13.

FIGS. 2-25 show a first embodiment of a coupling device 101 according to the invention which comprises two tension loops 102, a lock in the form of a nut and bolt joint 103, a hinge 104 and a spring 105 which is mounted at the hinge. The tension loops 102 which are moveable substantially in one level are designed with inner recesses 106 and in connection to the recesses provided, bevelled, inner loop surfaces 107 and 108. The inner edges 110 and 111 of the loop surfaces 107 and 108, respectively, which edges are faced towards a centre axis 109 (see FIGS. 5, 14), are provided on different radial distances from the centre axis 109 (see especially FIG. 15). A bolt portion of the nut and bolt joint 103 is pivotally fastened at 112 to one of the tension loops 102 and the whole nut and bolt joint 103 is led through a hole in the other tension loop 102, in which the nut head abuts a shoulder (not shown) in the nut hole. The bolt portion of the nut and bolt joint 103 can be tightened from the outside of the coupling device 101. This can suitably first take place manually and for final tightening a tool can be used as an Allen key or the like, so that the whole nut and bolt joint 103 will be situated inside the outer periphery of the coupling device.

At least on one side of both tension loops 102 a beveled surface 113 is provided at the opening against the centre hole 114 of the coupling device 101 to facilitate the introduction of a connection flange of a tube 121, a conduit or the like.

Figure 15:
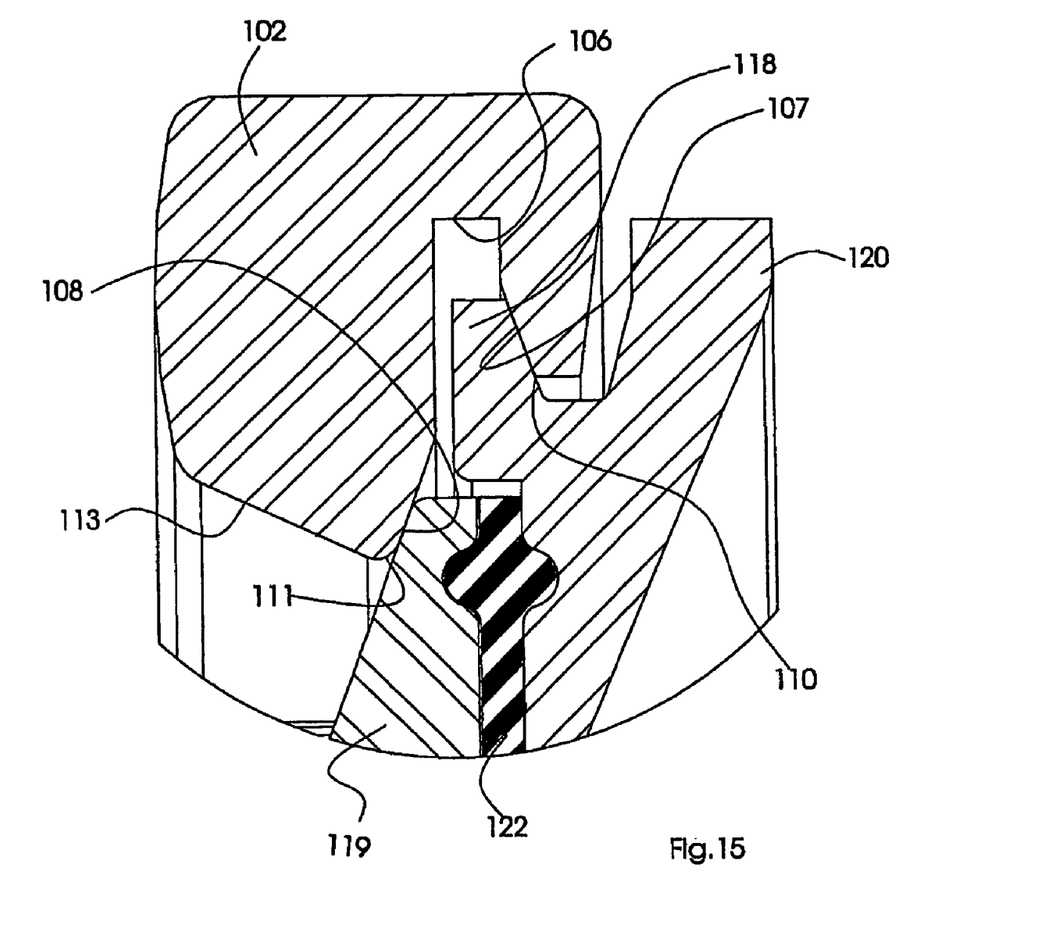
FIG. 15 shows a detail 15 in FIG. 14 in sectional view and in an enlarged scale.
Figure 16:
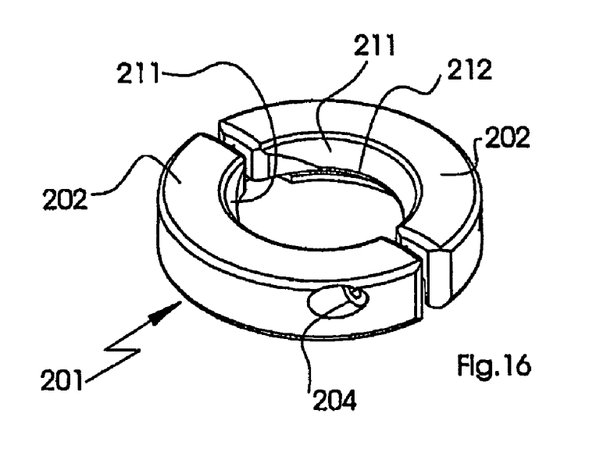
FIG. 16 shows a perspective view from above of a second embodiment of a coupling device according to the invention.
Figure 17:
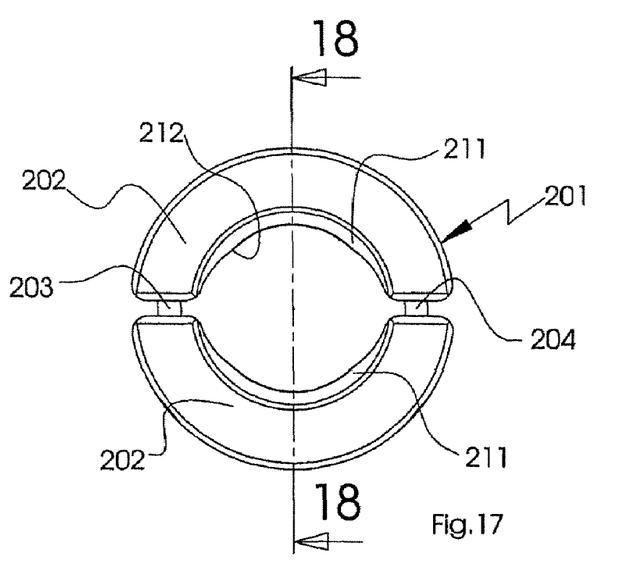
FIG. 17 shows a plan view of the coupling device in FIG. 16.

As especially can be seen in FIG. 15, the surfaces 107 and 108 which borders the recesses 106, are bevelled radially outwardly in a direction towards the recesses 106 to thereby provide tightening surfaces for received connection flanges 118 and 121, respectively, of a tank connection 120 and a tube connection 121, respectively (see FIGS. 11-15). A gasket 122 is placed in a known manner between the connection flanges 118, 119 and is formed to fit in intended recesses. As especially can be seen in FIG. 15, by providing the radially inner edges 110 and 111 of the loop surfaces 107 and 108, respectively, on different distances from the centre line 109 (see also FIG. 14), one of the connection flanges 118 can be held in the recess 106 after it is placed in the recess 106 and the lock 103 is tightened to a certain position where it still can be moved apart against the bias of the spring 105 either manually or by pressing the connection flanges 119 of the tube 121 towards the bevelled surfaces 113 on the tension loops.

FIGS. 16-21 show a second embodiment of a coupling device 201 according to the invention, which comprises two tension loops 202 and two locks in the form of nut and bolt joints 203 and 204. The tension loops 202 which are moveable substantially in one level are designed with inner recesses 205 and in connection to the recesses 205 provided, bevelled, inner loop surfaces 206 and 207. The inner edges 209 and 210 of the loop surfaces 206 and 207, respectively, which edges are faced against a centre axis 208 (see FIG. 18), are provided on different radial distances from the centre axis 208. Both nut and bolt joints 203, 204 are led through holes in one of the tension loops 202 and are screwed into holes in the other tension loop 202. The nut and bolt joints 203, 204 can be tightened from the outside of the coupling device 201. This can suitably first take place manually and for final tightening a tool can be used as an Allen key or the like, so that the whole nut and bolt joints 203, 204 will be situated inside the outer periphery of the coupling device.

Also at this embodiment, the surfaces 206 and 207 which border the recesses 205 are bevelled radially outwardly in the direction towards the recess 205 to thereby provide tension surfaces for in the coupling device 201 received, here not shown tension flanges of for instance a tank connection and a tube connection, respectively. A not shown gasket is placed in a known manner between the connection flanges and is formed to fit in intended recesses.

At least on one side of both tension loops 202, a bevelled surface 211 is provided at the opening against the centre hole 212 of the coupling device 201 to facilitate the introduction of the connection flange of the tube, a conduit or the like.

Figure 18:
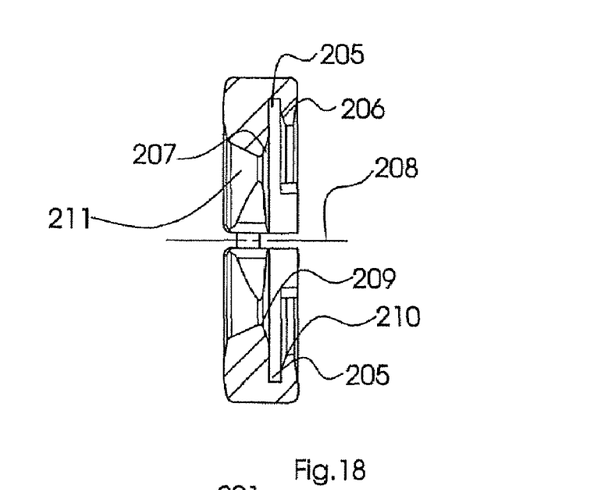
FIG. 18 shows a sectional view after the line 18-18 in FIG. 17.
Figure 19:
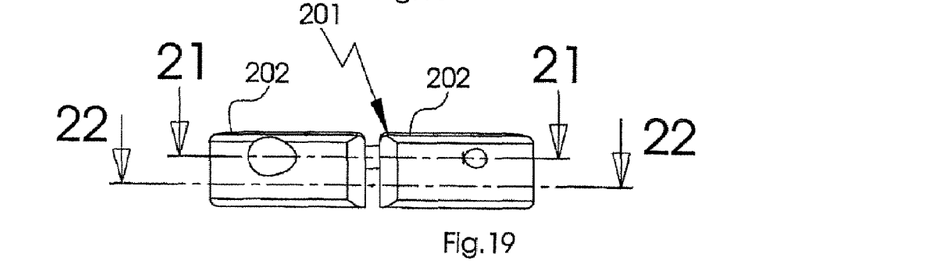
FIG. 19 shows a side view of the coupling device in FIG. 16.
Figure 20:
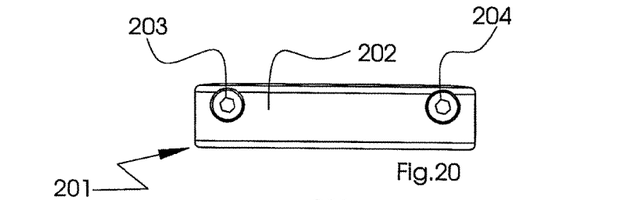
FIG. 20 shows a side view of the coupling device in FIG. 16 turned 90° in relation to FIG. 19.
Figure 21:
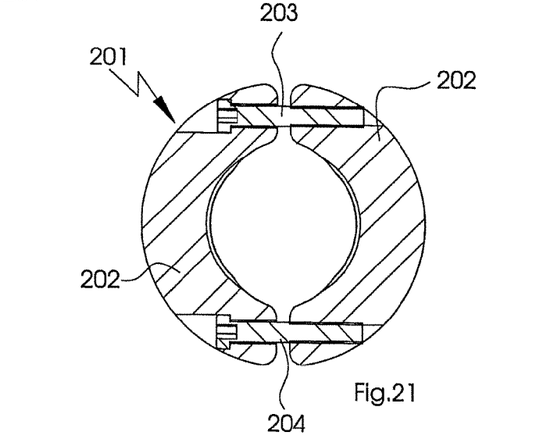
FIG. 21 shows a sectional view after the line 21-21 in FIG. 19.
Figure 22:
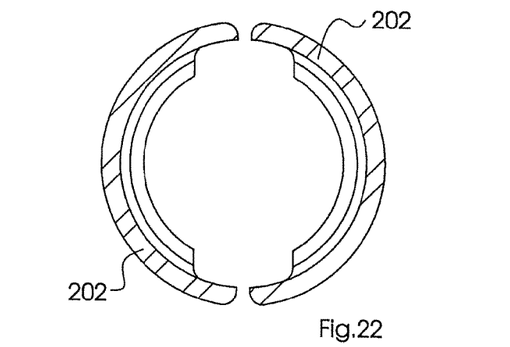
FIG. 22 shows a sectional view after the line 22-22 in FIG. 19.
Figure 23:
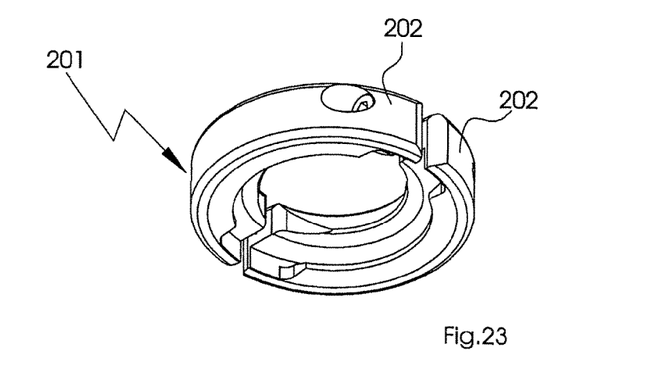
FIG. 23 shows a perspective view from below of the couplings device in FIG. 16.

As specially can be seen in FIG. 18, by providing the radially inner edges 209 and 210 of the loop surfaces 206 and 207, respectively, on different distances from the centre axis 208 one of the connection flanges can be hold in the recess 205 after it has been placed in the recess 205. At least on one side of both tension loops 202 a bevelled surface 211 is provided at the opening against the centre hole 212 of the coupling device 201 to facilitate the introduction of a connection flange of a tube, a conduit or the like. At this embodiment, not shown spring means can be placed in the hole of the nut and bolt joints to press the tension loops towards each other when the coupling is open. The locks in the form of the nut and bolt joints 203, 204 have been tightened to a certain position in which the tension loops 202 can be moved apart other manually or by pressing the connection flanges of the tube against the bevelled surfaces 211 on the tension loops 202.

The invention can be varied in several different ways within the scope of the appended claims even if the above described embodiments are to prefer. The spring means at both above shown embodiments can be omitted or mounted in another way than what is described above. Instead of the shown nut and bolt joints which constitute of bolts with over the bolts threaded elongated barrel nuts, clamping devices or other tightening means can be used. Thereby, it is of importance that a position can be provided in which one of the connection flanges is received inside one of the loop surfaces of the inner edges of the tension loops, which loop surfaces are situated closest to the centre axis of the coupling device, so that the coupling device can be kept in place on one of the connection flanges at demounting as well as mounting of the other connection flange.

The invention claimed is:

1. A coupling device, comprising:
    a first tension loop;
    a second tension loop connected to the first tension loop, wherein the first and second tension loops are moveable with respect to one another to establish open and closed positions;
    an interior surface defined by the first and second tension loops in the closed position;
    a recess defined by the interior surface;
    a first connecting flange clamping edge defined by the first and second tension loops on a first side of the recess; and
    a second connecting flange clamping edge defined by the first and second tension loops on a second side of the recess,
    wherein, at a facing end, at least one of the first and second tension loops comprises an introduction surface abutting the second connection flange clamping edge, the introduction surface being beveled radially inwardly towards a central hole defined by the first and second tension loops.

2. The coupling device of claim 1, wherein the first connecting flange clamping edge comprises a first inclined surface adjacent thereto, the first inclined surface being adapted to engage a first connecting flange when the first and second tension loops are in the closed position.

3. The coupling device of claim 2, wherein the second connecting flange clamping edge comprises a second inclined surface adjacent thereto, the second inclined surface being adapted to engage a second connecting flange.

4. The coupling device of claim 3, wherein the first and second inclined surfaces define the axial sides of the recess.

5. The coupling device of claim 1, wherein the second connecting flange clamping edge comprises a second inclined surface adjacent thereto, the second inclined surface being adapted to engage a second connecting flange.

6. The coupling device of claim 1, wherein the first and second tension loops define a central axis when in the closed position and the first connecting flange clamping edge is disposed a distance further from the central axis than the second connecting flange clamping edge.

7. The coupling device of claim 1, further comprising:
    at least one selected from a group comprising a bolt and screw and a tension device connecting the first and second tension loops to one another at a first connection point.

8. The coupling device of claim 7, further comprising:
    a rotatable joint connecting the first and second tension loops to one another at a second connection point.

9. The coupling device of claim 8, further comprising:
    a biasing element disposed adjacent to the rotatable joint to bias the first and second tension loops into the closed position.

10. The coupling device of claim of claim 9, further comprising:
    first and second beveled edges at the facing ends of the second connecting flange clamping edges on the first and second tension loops providing an introduction surface to bias the first and second tension loops into the opened position, against a closing force from the biasing element, upon contact with the first and second connecting flanges.

11. The coupling device of claim 7, wherein the first and second tension loops are connected to one another via a first bolt and screw at the first connection point and a second bolt and screw at a second connection point, the first and second bolt and screws being disposed substantially parallel to one another when the first and second tension loops are in the closed position.

12. The coupling device of claim 7, further comprising:
    a biasing element disposed adjacent to the one selected from the group comprising the bolt and screw and the tension device to bias the first and second tension loops into the closed position.

13. The coupling device of claim 12, further comprising:
    first and second beveled edges at the facing ends of the second connecting flange clamping edges on the first and second tension loops providing an introduction surface to bias the first and second tension loops into the opened position, against a closing force from the biasing element upon contact with the first and second connecting flanges.

* * * * *